United States Patent
Schisla

(10) Patent No.: US 6,228,947 B1
(45) Date of Patent: May 8, 2001

(54) DEPROTECTION OF POLYMERS PREPARED WITH SILYLOXY PROTECTED FUNCTIONAL INITIATORS BY REACTION WITH AQUEOUS FLUOROBORIC ACID

(75) Inventor: David Karl Schisla, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/490,200

(22) Filed: Jan. 24, 2000

Related U.S. Application Data

(60) Provisional application No. 60/121,843, filed on Feb. 26, 1999.

(51) Int. Cl.$^7$ ................................................. C08F 8/00
(52) U.S. Cl. .................. 525/250; 525/326.1; 525/331.9; 525/337
(58) Field of Search ................................ 525/250, 326.1, 525/331.9, 337

(56) References Cited

U.S. PATENT DOCUMENTS

| | | | |
|---|---|---|---|
| 5,081,191 | 1/1992 | Quirk | 525/288 |
| 5,331,058 | 7/1994 | Shepherd et al. | 525/332.3 |
| 5,336,726 | 8/1994 | DuBois | 525/272 |
| 5,486,568 | 1/1996 | Bening et al. | |
| 5,663,250 | 9/1997 | Potter et al. | |

FOREIGN PATENT DOCUMENTS

| | | |
|---|---|---|
| 0363990 | 4/1990 | (EP). |
| WO 97/05176 | 2/1997 | (WO). |
| WO 98/02465 | 1/1998 | (WO). |

OTHER PUBLICATIONS

"Cleavage of Tert–Butyldimethylsilyl Ethers by Tetrafluoroborate Salts," by B. W. Metcalf, J. P. Burkhart and K. Jund, *Tetrahedron Letters*, vol. 21, Pergamon Press Ltd. 1980, pp. 35–36.

"The Cleavage of t–Butyldimethylsilyl Ethers With Boron Trifluoride Etherate," by D. R. Kelly, S. M. Roberts,and R. F. Newton, *Synthetic Communications*, 9(4), (1979), pp. 295–299.

International Search Report of Jun. 20, 2000.

*Primary Examiner*—Jeffrey Mullis
(74) *Attorney, Agent, or Firm*—Donald F. Haas

(57) ABSTRACT

The present invention provides a process for making functionalized polymers comprising the steps of (a) initiating polymerization of an unsaturated monomer with a lithium initiator having the structure $R^1R^2R^3Si$—O—A—Li wherein A is a branched or straight chain bridging group having at least two carbon atoms, $R^1, R^2$, and $R^3$ are alkyl, alkoxy, aryl, or alkaryl groups having from 1 to 10 carbon atoms, thus producing a functionalized polymer which has a protecting silyl group at one end thereof; and (b) contacting the protected polymer with from 0.5 to 1.1 moles of aqueous fluoroboric acid per mole of polymer at 0 to 50° C. for 1 to 10 minutes, and (c) contacting the resulting solution with water, and (d) recovering a linear or branched deprotected polymer having one or more terminal functional groups.

6 Claims, No Drawings

DEPROTECTION OF POLYMERS PREPARED WITH SILYLOXY PROTECTED FUNCTIONAL INITIATORS BY REACTION WITH AQUEOUS FLUOROBORIC ACID

This application claims the benefit of U.S. Provisional Application No. 60/121,843, filed Feb. 26. 1999, the entire disclosure of which is hereby incorporated by reference

FIELD OF THE INVENTION

This invention relates to anionic polymerization of monomers to produce functionalized polymers with silyloxy reagents used as protected functional initiators for the synthesis of these polymers. More particularly, the present invention relates to an improved process for deprotection of such polymers made with silyloxy protected functional initiators.

BACKGROUND OF THE INVENTION

Anionic polymerization of conjugated dienes with lithium initiators, such as sec-butyllithium, and hydrogenation of residual unsaturation has been described in many references including U.S. Pat. No. Re. 27,145 which teaches a relationship between the amount of 1,2addition of butadiene and the glass transition temperatures of the hydrogenated butadiene polymers. The capping of living anionic polymers to form functional end groups is described in U.S. Pat. Nos. 4,417,029, 4,518,753, and 4,753,991. Of particular interest for the present invention are anionic polymers that are capped on one or more ends with hydroxyl, carboxyl, phenol, epoxy, or amine groups.

Anionic polymerization using protected functional initiators having the structure $R^1R^2R^3Si$—O—A'—Li is described in WO 91/12277 wherein $R^1$, $R^2$, and $R^3$ are preferably alkyl, alkoxy, aryl, or alkaryl groups having from 1 to 10 carbon atoms, and A' is preferably a branched or straight chain bridging group having at least 2 carbon atoms. $R^1$, $R^2$, and $R^3$ are preferably not all $H_3$. The bridging group (A') is most preferably a straight chain alkyl having from 3 to 10 carbon atoms. A referred protected initiator wherein all of the R groups are methyl groups is described in U.S. Pat. No. 5,416,168. The polymers produced by these initiators are readily endcapped and hydrogenated to form anionic polymers having one or more terminal functional groups under commercial attractive conditions.

As described in U.S. Pat. No. 5,416,168, deprotection has preferably been accomplished by acid-catalyzed hydrolysis although contact with dilute aqueous base solution is also possible. One preferred process involves dissolving methane sulfonic acid in water in an alcohol and then adding this to the polymer cement (the solution/slurry/suspension of the polymer in the polymerization solvent). Under appropriate conditions, deprotection is also known to be able to be accomplished by contacting the polymer with aqueous mineral acid.

These deprotection processes are robust and are capable of achieving satisfactory results. However, the acid catalyzed method suffers from two significant deficiencies. The principle coproduct of this reaction, hexamethyldisiloxane (HMDS), is difficult to remove from the process solvent which is normally used, cyclohexane, greatly complicating solvent recycle. In addition, the extent of hydrolysis generally fails to exceed 97 percent. This appears to be an equilibrium limitation. Removal of the solvent and volatile silicon compounds, followed by addition of clean cyclohexane and a second aqueous acid contact, results in complete hydrolysis but this process is expensive and time consuming.

It can be seen that there is a need for a process which accomplishes a high degree of deprotection without the formation of difficult to remove silicon compounds. Furthermore, there is a need for a process which can achieve 98 to 100 percent deprotection without the necessity of multiple treating steps. The present process provides these advantages.

SUMMARY OF THE INVENTION

The present invention provides a process for making functionalized polymers comprising the steps of (a) initiating polymerization of an unsaturated monomer with a lithium initiator having the structure $R^1R^2R^3Si$—O—A—Li wherein A is a branched or straight chain bridging group having at least two carbon atoms, $R^1,R^2$, and $R^3$ are alkyl, preferably methyl, alkoxy, aryl, or alkaryl groups having from 1 to 10 carbon atoms, thus producing a functionalized polymer which has a protecting silyl group at one end thereof; and (b) contacting the protected polymer with from 0.50 to 1.10 moles of aqueous fluoroboric acid per mole of polymer at 0 to 50° C. for 1 to 10 minutes; and (c) contacting the resulting solution with water to remove boric acid and excess fluoroboric acid; and (d) instead of or in addition to a water wash, contacting the polymer cement solution of step (b) or (c) with an aqueous base; and (e) recovering a linear or branched deprotected polymer having one or more terminal functional groups.

This novel deprotection process generates an easily-separated co-product and proceeds to completion in one step. Preferably, from 0.9 to 1.1 moles of fluroboric acid per mole of polymer are used. This process is highly advantageous in that it can be carried out in the same hydrocarbon solvent that is used to polymerize the protected polymer.

DETAILED DESCRIPTION OF THE INVENTION

The polymerization of unsaturated monomers with protected functional initiators as described above is described in detail in U.S. Pat. No. 5,416,168 which is herein incorporated by reference. Following those teachings, a polymer is produced which has a functional group on one end and on the other end has a functional group which has been reacted with a silyl alkoxy protected functional initiator which serves as a "masked" or "protected" alcohol, capable of conversion to a primary, neopentyl-type alcohol group after polymerization is completed by reaction with acids or bases under mild, low cost conditions.

The lithium initiator process is well known as described in U.S. Pat. Nos. 4,039,593 and Re. 27,145 which descriptions are incorporated herein by reference. Typical living polymer structures that can be made with lithium initiators such as Structure (2) include:

X-B-Li
X-B/A-Li
X-A-B-Li
X-B-A-Li
X-B-B/A-Li
X-B/A-B-Li
X-A-B-A-Li wherein B represents polymerized units of one or more conjugated diene hydrocarbons, A represents polymerized units of one or more vinyl aromatic compounds, B/A represents random polymerized units of the conjugated diene hydrocarbons and the vinyl aromatic monomers, and X is the residue of the lithium initiator. The living polymers are terminated as linear polymers, coupled to form branched polymers, or capped to form additional functional groups by conventional means such as addition of methanol, silicon tetrachloride, divinylbenzene, or ethylene oxide. In the present invention, X is a trimethylsilyl ether group and cleavage of the trimethylsilyl ether leaves a neopentyl-like primary alcohol group in this position.

The initiators of the present invention are very active at room temperature and polymerization is preferably initiated at a temperature from 15° C. to 60° C., most preferably from 30° C. to 40° C. Polymerizations can be carried out over a range of solids levels, preferably from about 5% to about 80% wt polymer, most preferably from about 10% to about 40% wt.

Anionic polymerization is often terminated by addition of water to remove the lithium as lithium hydroxide (LiOH) or by addition of an alcohol (ROH) to remove the lithium as a lithium alkoxide (LiOR). Polymers prepared from initiators of the present invention and terminated in this way will be monohydroxy functional materials (mono-ols) after removal of the trimethylsilyl protecting group. To prepare polymers having additional terminal functional groups, the living polymer chains are preferably reacted (end capped) with hydroxyl (—OH), carboxyl (—$CO_2$H), phenol (ArOH), epoxy, or amine groups by reaction with ethylene oxide (—OH), oxetane (—OH), 2,2-dimethyloxetane (—OH), carbon dioxide (—$CO_2$H), a protected hydroxystyrene monomer (ArOH), ethylene oxide plus epichlorohydrin (epoxy), or the aziridine compounds listed in U.S. Pat. No. 4,791,174 (amine). For the preparation of telechelic diols, the preferred process is to terminate with 1 to 10 equivalents, most preferably 1 to 2 equivalents, of ethylene oxide at 30° C.–50° C. This reaction is quite rapid; reaction times from 5 to 30 minutes yield acceptable results.

Hydrogenation of at least 90%, preferably at least 95%, of the unsaturation in low molecular weight butadiene polymers is achieved with nickel catalysts as described in U.S. Pat. Nos. Re. 27,145 and 4,970,254 which are incorporated by reference herein. The preferred nickel catalyst is a mixture of nickel 2-ethylhexanoate and triethylaluminum described in more detail in the examples.

After polymerization and, optionally, hydrogenation and washing of the polymer, the silyloxy group at the end of the polymer chain is removed to generate the desired primary hydroxyl-functional group on the polymer. In the present invention, this deprotection step is carried out by contacting the polymer with from 0.5 to 1.1 moles of aqueous fluoroboric acid per mole of polymer, preferably 0.9 to 1.1, contacting the resulting solution with water to remove boric acid and excess fluoroboric acid, and then recovering the deprotected polymer having one or more terminal functional groups. The deprotected polymer could also be contacted with an aqueous base before recovery of the polymer if it is desirable to reduce the corrosivity of the aqueous water wash phase.

The process is preferably carried out at a temperature of from 0 to 50° C., most preferably 20 to 30° C. Essentially complete conversion of the protected polymer to the deprotected polymer is achieved in from 1 to 10 minutes. The principle co-product of this deprotection reaction is $(R)_3SiF$ which is relatively inert and easily separated from the polymerization solvent, usually cyclohexane, by distillation. The other coproduct, $BF_3$, reacts with water to form boric acid which is removed along with the excess $HBF_4$ by extraction with the water phase.

The water wash step is usually carried out by contacting the polymer cement with an aqueous phase in such a manner that the water phase is finely dispersed in the cement to attain efficient transfer of the fluoroboric acid to the aqueous phase. A typical phase ratio of water to polymer cement for the wash is 0.1 v/v.

The process of the present invention works well on unhydrogenated terminated polymers and also on hydrogenated polymers from which the catalyst residue has been removed. The process will not work as well with a cement containing large amounts of base, occurring from either residual lithium alkoxide produced from alcohol termination of a living polymer, or excess hydrogenation catalyst. A basic cement precursor would then require additional acid to neutralize the polymer cement before deprotection could proceed with fluoroboric acid.

EXAMPLES

Example 1

A 3300 number average molecular weight ethylene-butylene polymer with alcohol functionality on each end of the molecule was made according to the protected functional initiator process described above. The protected functional initiator was $(CH_3)_3$—Si—O—$CH_2$—C—$(CH_3)_2$—$CH_2$—Li. The protected polymer solution in cyclohexane contained 41 percent weight of the protected polymer and 167 parts per million of water. The extent of deprotection by the following process was determined by $^1$HNMR.

This polymer solution was treated with a 48 percent by weight aqueous solution of $HBF_4$ and a molar ratio of fluoroboric acid to polymer of 1.1:1 at 20° C. for 10 minutes. The extent of deprotection before the water wash was 100 percent. This solution was then washed with water at an aqueous wash phase ratio of 0.1 v/v. After this step, the extent of deprotection was 99 percent.

Aqueous $HBF_4$ solution is highly corrosive. In an attempt to reduce the corrosivity of the aqueous wash phase, the polymer solution following contacting with $HBF_4$ may alternatively be washed with aqueous ammonium hydroxide. In a second example, the extent of deprotection decreased from 98 percent deprotection with no reprotection to 98 deprotection with 1 percent reprotection after base washing the polymer cement-fluoroboric acid phase with aqueous ammonium hydroxide. Hence, the base wash of the polymer cement phase reduced the overall degree of deprotection by only 1 percent over the conditions observed, the same as with the water wash.

We claim:

1. A process for making functionalized polymers comprising the steps of
    (a) initiating polymerization of an unsaturated monomer with a lithium initiator having the structure $R^1R^2R^3Si$—O—A—Li wherein A is a branched or straight chain bridging group having at least two carbon atoms, $R^1$, $R^2$, and $R^3$ are alkyl, alkoxy, aryl, or alkaryl groups having from 1 to 10 carbon atoms, thus producing a functionalized polymer which has a protecting silyl group at one end thereof; and
    (b) contacting the protected polymer with from 0.5 to 1.1 moles of aqueous fluoroboric acid per mole of polymer at 0 to 50° C. for 1 to 10 minutes, and
    (c) contacting the resulting solution with water, and
    (d) recovering a linear or branched deprotected polymer having one or more terminal functional groups.

2. The process of claim 1 wherein from 0.9 to 1.1 equivalents of fluoroboric acid are utilized in step (b).

3. The process of claim 1 wherein $R^1$, $R^2$, and $R^3$ are methyl groups.

4. The process of claim 1 wherein the solution of step (b) is further contacted with an aqueous base.

5. The process of claim 1 wherein the solution from step (b) or step (c) is further contacted with an aqueous base.

6. A process for making functionalized polymers comprising the steps of
- (a) initiating polymerization of an unsaturated monomer with a lithium initiator having the structure $R^1R^2R^3Si$—O—A—Li wherein A is a branched or straight chain bridging group having at least two carbon atoms, $R^1, R^2$, and $R^3$ are alkyl, alkoxy, aryl, or alkaryl groups having from 1 to 10 carbon atoms, thus producing a functionalized polymer which has a protecting silyl group at one end thereof; and
- (b) contacting the protected polymer with from 0.5 to 1.1 moles of aqueous fluoroboric acid per mole of polymer at 0 to 50° C. for 1 to 10 minutes, and
- (c) contacting the resulting solution with an aqueous base, and
- (d) recovering a linear or branched deprotected polymer having one or more terminal functional groups.

\* \* \* \* \*